US012312563B2

(12) United States Patent
Stenger et al.

(10) Patent No.: US 12,312,563 B2
(45) Date of Patent: May 27, 2025

(54) LIQUID DETERGENT COMPOSITIONS

(71) Applicant: The Procter & Gamble Company, Cincinnati, OH (US)

(72) Inventors: Patrick Christopher Stenger, Fairfield, OH (US); Erin Juliette Aultman, West Chester, OH (US); Brian Joseph Loughnane, Sharonville, OH (US); Vincent John Becks, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 640 days.

(21) Appl. No.: 17/541,311

(22) Filed: Dec. 3, 2021

(65) Prior Publication Data

US 2023/0174901 A1 Jun. 8, 2023

(51) Int. Cl.

| | |
|---|---|
| ***C11D 1/00*** | (2006.01) |
| ***C11D 1/22*** | (2006.01) |
| ***C11D 1/29*** | (2006.01) |
| ***C11D 1/72*** | (2006.01) |
| ***C11D 3/18*** | (2006.01) |
| ***C11D 3/20*** | (2006.01) |
| ***C11D 3/34*** | (2006.01) |

(52) U.S. Cl.

CPC .............. *C11D 3/182* (2013.01); *C11D 3/201* (2013.01); *C11D 3/3409* (2013.01); *C11D 2111/12* (2024.01)

(58) Field of Classification Search

CPC .... C11D 1/00; C11D 1/22; C11D 1/29; C11D 1/72; C11D 3/18; C11D 3/182; C11D 3/34; C11D 11/0017

See application file for complete search history.

(56) References Cited

U.S. PATENT DOCUMENTS

| | | | |
|---|---|---|---|
| 3,480,556 A | 11/1969 | Witt et al. | |
| 4,441,881 A | 4/1984 | Ruppert et al. | |
| 6,060,443 A | 5/2000 | Cripe | |
| 6,228,829 B1 | 5/2001 | Vinson et al. | |
| 7,439,403 B2 | 10/2008 | Hoelscher | |
| 9,493,725 B2 * | 11/2016 | Vinson | C11D 1/143 |
| 9,493,726 B2 * | 11/2016 | Vinson | C11D 3/38636 |
| 10,441,519 B2 | 10/2019 | Zhao et al. | |
| 11,807,829 B2 * | 11/2023 | Vinson | C11D 1/14 |
| 11,807,831 B2 * | 11/2023 | Stenger | C11D 17/0008 |
| 11,891,587 B2 * | 2/2024 | Vinson | C11D 1/94 |
| 2002/0022583 A1 | 2/2002 | Buzzaccarini et al. | |
| 2003/0216278 A1 | 11/2003 | Depoot et al. | |
| 2016/0068784 A1 * | 3/2016 | Vinson | C11D 3/38636 510/357 |
| 2016/0068785 A1 | 3/2016 | Vinson et al. | |
| 2017/0137747 A1 | 5/2017 | Tang | |
| 2017/0175058 A1 | 6/2017 | Depoot | |
| 2017/0253839 A1 | 9/2017 | Scheibel | |
| 2018/0110697 A1 | 4/2018 | Smith, III | |
| 2019/0117544 A1 | 4/2019 | Zhao et al. | |
| 2020/0283705 A1 | 9/2020 | Smets | |
| 2020/0407665 A1 | 12/2020 | Joos | |
| 2021/0380902 A1 | 12/2021 | Vinson et al. | |
| 2022/0064569 A1 | 3/2022 | Vinson et al. | |
| 2022/0401332 A1 | 12/2022 | Akintelure et al. | |
| 2023/0174894 A1 | 6/2023 | Stenger | |
| 2023/0174896 A1 | 6/2023 | Stenger et al. | |

FOREIGN PATENT DOCUMENTS

| | | |
|---|---|---|
| CA | 2271200 A1 | 6/1998 |
| EP | 0439316 A2 | 7/1991 |
| GB | 2208516 A | 4/1989 |
| JP | 2010013579 A | 1/2010 |
| WO | 9823566 A1 | 6/1998 |
| WO | 2007064525 A1 | 6/2007 |
| WO | 2013000571 A1 | 1/2013 |
| WO | 2016040241 A1 | 3/2016 |
| WO | 2016040248 A2 | 3/2016 |
| WO | 2019055256 A1 | 3/2019 |
| WO | 2021247801 A1 | 12/2021 |

OTHER PUBLICATIONS

All Office Actions; U.S. Appl. No. 17/337,493, filed Jun. 3, 2021.
Search Report and Written Opinion for PCT/US2022/080393 dated Feb. 23, 2023, 13 pages.

* cited by examiner

*Primary Examiner* — Brian P Mruk
(74) *Attorney, Agent, or Firm* — Andrew J. Mueller

(57) ABSTRACT

Liquid detergent compositions can include a first surfactant which is a mixture of surfactant isomers of Formula 1 and surfactants of Formula 2:

Formula 1

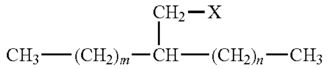

Formula 2

$$CH_3-(CH_2)_{m+n+3}-X$$

$6 \leq m \leq 11$;
$0 \leq n \leq 5$;

wherein from about 50% to about 100% by weight of the first surfactant are isomers having m+n=11; wherein between about 25% to about 50% of the mixture of surfactant isomers of Formula 1 have n=0; wherein from about 0.001% to about 25% by weight of the first surfactant are surfactants of Formula 2; and wherein X is a hydrophilic moiety; and a second surfactant including a $C_{12}$-$C_{15}$ alkyl ethoxy sulfate with an average degree of ethoxylation of about 1.5 to about 3.

20 Claims, No Drawings

LIQUID DETERGENT COMPOSITIONS

FIELD OF THE INVENTION

Liquid detergent compositions which include a first surfactant and a second surfactant, where the first surfactant is a branched alkyl sulfate, and the second surfactant is a $C_{12}$-$C_{16}$ alkyl ethoxy sulfate.

BACKGROUND OF THE INVENTION

Liquid detergent compositions are routinely used to wash substrates, like fabric. The formulation of a liquid detergent composition is a balance, among other things, of the ability to sufficiently clean the target substrate without damaging the substrate being cleaned. Thus, it is beneficial to find and utilize efficient cleaning surfactants which can be used at a level that is not potentially damaging to the target substrate. As such, there is a need for cleaning surfactants which are capable of being used at a level which is both efficient and, preferably innocuous to the target substrate.

SUMMARY OF THE INVENTION

Included herein, for example, is a liquid detergent composition comprising a) from about 1% to about 30%, by weight of the composition of a first surfactant consisting essentially of a mixture of surfactant isomers of Formula 1 and surfactants of Formula 2:

Formula 1

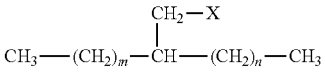

Formula 2

$$CH_3—(CH_2)_{m+n+3}—X$$

$6 \leq m \leq 11$;
$0 \leq n \leq 5$;

wherein from about 50% to about 100% by weight of the first surfactant are isomers having m+n=11; wherein between about 25% to about 50% of the mixture of surfactant isomers of Formula 1 have n=0; wherein from about 0.001% to about 25% by weight of the first surfactant are surfactants of Formula 2; and wherein X is a hydrophilic moiety; b) from about 1% to about 30%, by weight of the composition of a second surfactant comprising a $C_{12}$-$C_{16}$ alkyl ethoxy sulfate with an average degree of ethoxylation of about 1.5 to about 3; and c) a detergent adjunct.

Also included herein, for example, is a liquid detergent composition, comprising a) a first surfactant consisting essentially of a mixture of surfactant isomers of Formula 1 and surfactants of Formula 2:

Formula 1

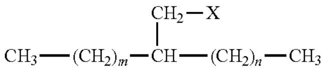

Formula 2

$$CH_3—(CH_2)_{m+n+3}—X$$

$6 \leq m \leq 11$;
$0 \leq n \leq 5$;

wherein from about 50% to about 100% by weight of the first surfactant are isomers having m+n=11; wherein between about 25% to about 50% of the mixture of surfactant isomers of Formula 1 have n=0; wherein from about 0.001% to about 25% by weight of the first surfactant are surfactants of Formula 2; and wherein X is a hydrophilic moiety; and b) a second surfactant comprising a $C_{12}$-$C_{15}$ alkyl ethoxy sulfate with an average degree of ethoxylation of about 1.5 to about 3; wherein the ratio by weight of the first surfactant to the second surfactant is from about 15:1 to about 1:5.

These and other incarnations will be more fully described throughout the specification.

DETAILED DESCRIPTION OF THE INVENTION

For liquid detergent compositions the ultimate goal is to efficiently clean the target substrate, like a fabric. Cleaning efficiency translates to a lower cost product and a more sustainable product. While surfactants in general have long been used as a tool for cleaning, not all surfactants are efficient cleaners, and many are good at cleaning one type of soil but not another. In addition, the general belief is that the more surfactant the better the cleaning. There are limits, however, to how much surfactant can be contained within a given product due to cost, formulation incompatibilities, and processing concerns.

The present inventors investigated whether it is possible to find synergies between certain surfactants which could help in the reduction of the total amount of surfactant needed to clean a substrate, result in a better cleaning of the substrate, or both. Two surfactants investigated included an anionic alkyl ethoxy sulfate (a $C_{12-15}$ alkyl portion with an average level of ethoxylation of 2.5) and an anionic surfactant comprising a branched alkyl sulfate (a mixture of surfactant isomers of Formula 1 and surfactants of Formula 2:

Formula 1

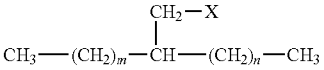

Formula 2

$$CH_3—(CH_2)_{m+n+3}—X$$

$6 \leq m \leq 11$;
$0 \leq n \leq 5$;

wherein from about 50% to about 100% by weight of the first surfactant are isomers having m+n=11; wherein between about 25% to about 50% of the mixture of surfactant isomers of Formula 1 have n=0; wherein from about 0.001% to about 25% by weight of the first surfactant are surfactants of Formula 2; and wherein X is a hydrophilic moiety).

To investigate whether a synergy exists between these materials, a liquid detergent composition is made (Comparative Composition A). This composition is a liquid detergent chassis without either the alkyl ethoxy sulfate or the branched alkyl sulfate. Comparative Compositions B, D, and F are also made which is the liquid detergent chassis with the addition of alkyl ethoxy sulfate and Comparative Compositions C, E, and G are the liquid detergent chassis with the addition of the branched alkyl sulfate. Inventive Compositions 1-3 are made with both the alkyl ethoxy sulfate and the branched alkyl sulfate. The formulas for Comparative Compositions A-G and Inventive Compositions 1-3 are in the Examples section below.

The cleaning efficiency of each of the Comparative Compositions A-G is tested. To do this, technical stain swatches of CW120 cotton are acquired. These stain swatches include Discriminative Sebum (PCS132), ASTM Dust Sebum (PCS94), American Lipton Tea (GSRTLIT001), Covergirl Makeup (GSRTCGM001), Cooked Beef (GSRTCB001), Dyed Bacon Grease (GSRTBGD001), and Grass (GSRTGR001), purchased from Accurate Product Development (Fairfield, OH). The stain swatches along with one of Comparative Compositions A-G and Inventive Compositions 1-3 are run through a simulated washing cycle in a tergotometer. The method for this is listed below in the Methods section called Stain Removal Index Method.

When looking for synergy, one is looking for more than an additive effect. So, one looks at the impact of each of the given materials individually, the expected effect of utilizing them together, and the actual effect of using them together. The cleansing efficiency is evaluated utilizing a stain removal index calculated as follows:

$$\text{Stain Removal Index } (SRI) = \frac{\Delta E_{initial} - \Delta E_{washed}}{\Delta E_{initial}} \times 100$$

$\Delta E_{initial}$=Stain level before washing, calculated from the difference between the standard L*, a* and b* colorimetric measurement of the unwashed stain and unwashed background fabric and $\Delta E_{washed}$=Stain level after washing, calculated from the difference between the standard L*, a* and b* colorimetric measurement of the washed stain and unwashed background fabric. In addition, to consider the chassis (Comparative Composition A) and any benefits seen from the chassis, the values in Table 1-3 are the delta SRI. Delta SRI is calculated by subtracting the SRI of the chassis from that of the composition in question.

As can be seen in Table 1 below, the actual stain removal index of Inventive Composition 1 (with 2.11% by weight of each of the alkyl ethoxy sulfate and branched alkyl sulfate) is 1.2 Delta SRI units above that of the expected result for the discriminative sebum stain. A similar result is observed for the dust sebum and tea stains which were 1.1 and 0.7 respectively above the expected delta SRI value. This indicates a synergy between the alkyl ethoxy sulfate and the branched alkyl sulfate for stain removal, particularly for discriminative sebum, dust sebum, and tea stains.

TABLE 1

| STAIN TYPE | Delta SRI Comparative Composition B (B) | Delta SRI Comparative Composition C (C) | Expected Result (B) + (C) | Delta SRI Inventive Composition 1 Actual Result | Synergy Inventive Composition 1 > Expected B + C |
|---|---|---|---|---|---|
| Discriminative Sebum | 1.7 | 0.7 | 2.4 | 3.6 | +1.2 |
| Dust Sebum | 2.4 | 1.6 | 4.0 | 5.2 | +1.1 |
| American Lipton Tea | 0.9 | 0.8 | 1.7 | 2.4 | +0.7 |

Additional testing is completed at differing levels of total surfactant to determine if the synergy exists at different surfactant concentrations. As can be seen in Tables 2 and 3 below, a synergy is also present at levels of 4.23 (Table 2) and 8.26 (Table 3) 0% by weight of the composition of each of the alkyl ethoxy sulfate and branched alkyl sulfate. For Inventive Composition 2 a synergistic cleaning effect is seen with respect to stains including makeup, dust sebum, discriminative sebum, cooked beef, bacon grease, grass, and tea. For Inventive Composition 3, a synergy is seen with stains including, for example, cooked beef and bacon grease.

TABLE 2

| Stain Type | Delta SRI Comparative Composition D (D) | Delta SRI Comparative Composition E (E) | Expected Result (D) + (E) | Delta SRI Inventive Composition 2 Actual Result | Synergy Inventive Composition 2 > Expected D + E |
|---|---|---|---|---|---|
| Covergirl Makeup | 2.6 | 6.5 | 9.1 | 11.9 | +2.8 |
| Dust Sebum | 3.1 | 3.3 | 6.4 | 8.8 | +2.4 |
| Discriminative Sebum | 3.2 | 1.3 | 4.5 | 6.8 | +2.3 |
| Cooked Beef | 4.8 | 13.1 | 17.9 | 19.7 | +1.8 |
| Bacon Grease | 0 | 0.9 | 0.9 | 2.6 | +1.7 |
| Grass | 0 | 0 | 0 | 0.8 | +0.8 |
| American Lipton Tea | 2.1 | 0.7 | 2.8 | 3.3 | +0.5 |

TABLE 3

| Stain Type | Delta SRI Comparative Composition F (F) | Delta SRI Comparative Composition G (G) | Expected Result (F) + (G) | Delta SRI Inventive Composition 3 Actual Result | Synergy Inventive Composition 3 > Expected F + G |
|---|---|---|---|---|---|
| Cooked Beef | 0.2 | 5.1 | 5.3 | 14.1 | +8.8 |
| Bacon Grease | 5.5 | 25.1 | 30.7 | 31.4 | +0.7 |

Given the synergy observed between the alkyl ethoxy sulfate and the branched alkyl sulfate, it is believed a liquid detergent formulation can be formulated which can have less total surfactant but have a similar or better cleaning performance to a liquid detergent with a higher level of total surfactant utilizing different types of surfactant. This can give additional formulation flexibility, cost savings, and provide opportunities for a more sustainable formula.

Liquid Detergent Composition

A liquid detergent composition can include a first surfactant comprising a branched alkyl sulfate and a second surfactant comprising an alkyl ethoxy sulfate. The liquid detergent composition may comprise from about 5% to about 60% by weight of total surfactant. The liquid detergent composition may comprise from about 5%, 6%, 7%, 8%, 9%, or 10% to about 8%, 9%, 10%, 12%, 14%, 16%, 18%, 20%, 22%, 24%, 26%, 28%, 30%, 32%, 34%, 36%, 38%, 40%, 45%, 50%, or any combination thereof, by weight of the composition of total surfactant. The ratio by weight of the first surfactant to the second surfactant can be from about 10:1 to about 1:2, from about 7:1 to about 1:2, from about 5:1 to about 1:2, from about 3:1 to about 1:2, from about 2:1 to about 1:2, or about 1:1. The liquid detergent composition may also comprise from about 1% to about 95% of a carrier, like water. The liquid detergent composition can be a laundry detergent composition. A liquid "laundry detergent composition" includes any composition capable of cleaning fabric in a washing machine or in a hand wash context. The liquid laundry detergent compositions can be used in high efficiency and standard washing machines, in addition to hand washing in a tub or basin for example.

The liquid detergent composition can have a greater stain removal index (calculation noted above) than the combination of stain removal indices of a first reference composition comprising the first surfactant and a second reference composition comprising the second surfactant. The first reference composition would not contain the second surfactant and the second reference composition would not contain the first surfactant. An example of a chassis which can be used to make the first and second reference compositions is Comparative Example A. In addition, the liquid detergent composition can have an actual stain removal index which is 0.5 units or more above that of its expected stain removal index. The actual and expected stain removal indices can be calculated as noted above. The stain removal index may be measured on, for example, a cotton swatch. The stain utilized in assessing the stain removal index may comprise make-up, dust sebum, discriminative sebum, cooked beef, bacon grease, grass, or American tea.

Branched Alkyl Sulfate

A liquid detergent composition can comprise from about 1% to about 30% by weight of the composition of a first surfactant comprising a branched alkyl sulfate. The liquid detergent composition may also comprise from about 1%, 2%, 3%, 4%, 5%, 6%, 7%, 8%, 9%, or 10% to about 5%, 6%, 7%, 8%, 9%, 10%, 12%, 14%, 16%, 18%, 20%, 22%, 24%, 26%, 28%, or any combination thereof, by weight of the composition of a branched alkyl sulfate. The branched alkyl sulfate can comprise a 2-alkyl branched alkyl alcohol. 2-alkyl branched alcohols are positional isomers, where the location of the hydroxymethyl group (consisting of a methylene bridge ($—CH_2—$ unit) connected to a hydroxy ($—OH$) group) on the carbon chain varies. Thus, a 2-alkyl branched alkyl alcohol is generally composed of a mixture of positional isomers. Furthermore, it is well known that fatty alcohols, such as 2-alkyl branched alcohols, and surfactants are characterized by chain length distributions. In other words, fatty alcohols and surfactants are generally made up of a blend of molecules having different alkyl chain lengths (though it is possible to obtain single chain-length cuts). Notably, the 2-alkyl primary alcohols described herein, which may have specific alkyl chain length distributions and/or specific fractions of certain positional isomers, cannot be obtained by simply blending commercially available materials. Specifically, the distribution of from about 50% to about 100% by weight surfactants having m+n=11 is not achievable by blending commercially available materials.

The liquid detergent composition can comprise a first surfactant, wherein said first surfactant consists essentially of a mixture of surfactant isomers of Formula 1 and surfactants of Formula 2:

Formula 1

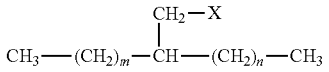

Formula 2

$$CH_3—(CH_2)_{m+n+3}—X$$

wherein from about 50% to about 100% by weight of the first surfactant are isomers having m+n=11; wherein from about 25% to about 50% of the mixture of surfactant isomers of Formula 1 have n=0; wherein from about 0.001% to about 25% by weight of the first surfactant are surfactants of Formula 2; and wherein X is a hydrophilic moiety.

X can be, for example, neutralized with sodium hydroxide, potassium hydroxide, magnesium hydroxide, lithium hydroxide, calcium hydroxide, ammonium hydroxide, monoethanolamine, diethanolamine, triethanolamine, monoisopropanolamine, diamine, polyamine, primary amine, secondary amine, tertiary amine, amine containing surfactant, or a combination thereof.

X may be selected from sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonioalkanesulfonates, amidopropyl betaines, alkylated quats, alkyated/polyhydroxyalkylated quats, alkylated/polyhydroxylated oxypropyl quats, imidazolines, 2-yl-succinates, sulfonated alkyl esters, sulfonated fatty acids, and mixtures thereof.

The first surfactant may have between about 15% to about 40% of the mixture of surfactant isomers of Formula 1 have n=1, such as, for example between about 20% to about 40%, between about 25% to about 35%, or between about 30% to about 40%. The first surfactant may have between about 60% to about 90% of the mixture of surfactant isomers of Formula 1 have n<3, such as, for example between about 65% and 85%, between about 70% and 90%, or between about 80% and 90%. The detergent composition may have between about 90% to about 100% of the first surfactant where the isomers have m+n=11, such as, for example between about 95% and 100%.

The first surfactant may have from about 15% to about 40% by weight of the first surfactant mixture are isomers of Formula 1 with n=1 and from about 5% to about 20% by weight of the first surfactant mixture are isomers of Formula 1 with n=2. The first surfactant may have no isomers of Formula 1 with n equal to or greater than 6. The first surfactant may have up to about 40% of the mixture of surfactant isomers of Formula 1 with n>2. The first surfactant may have up to about 25% of the mixture of surfactant isomers of Formula 1 have n>2. The first surfactant may have up to about 20% by weight of the Formula 2 isomer.

Impurities

The process of making the 2-alkyl primary alcohol-derived surfactants described above may produce various impurities and/or contaminants at different steps of the process.

The C14 olefin and C12 olefin sources used in the hydroformylation to make the starting C15 aldehydes and C13 aldehydes and subsequent alcohols and corresponding surfactants of use in the present invention may have low levels of impurities that lead to impurities in the starting C15 alcohols and C13 alcohol and therefore also in the C15 alkyl sulfate and C13 alkyl sulfate. While not intending to be limited by theory, such impurities present in the C14 olefin and C12 olefin feeds can include vinylidene olefins, branched olefins, paraffins, aromatic components, and low levels of olefins having chain-lengths other than the intended 14 carbons or 12 carbons. Branched and vinylidene olefins are typically at or below 5% in C14 and C12 alpha olefin sources. Impurities in the resulting C15 alcohols and C13 alcohols can include low levels of linear and branched alcohols in the range of C10 to C17 alcohols, especially C11 and C15 alcohols in the C13 alcohol, and especially C13 and C17 alcohols in the C15 alcohol, typically less than 5% by weight of the mixture, preferably less than 1%; low levels of branching in positions other than the 2-alkyl position resulting from branched and vinylidene olefins are typically less than about 5% by weight of the alcohol mixture, preferably less than 2%; paraffins and olefins, typically less than 1% by weight of the alcohol mixture, preferably less than about 0.5%; low levels of aldehydes with a carbonyl value typically below 500 mg/kg, preferably less than about 200 mg/kg. These impurities in the alcohol can result in low levels of paraffin, linear and branched alkyl sulfates having total carbon numbers other than C15 or C13, and alkyl sulfates with branching in positions other than the 2-alkyl location, wherein these branches can vary in length, but are typically linear alkyl chains having from 1 to 6 carbons. The step of hydroformylation may also yield impurities, such as linear and branched paraffins, residual olefin from incomplete hydroformylation, as well as esters, formates, and heavy-ends (dimers, trimers). Impurities that are not reduced to alcohol in the hydrogenation step may be removed during the final purification of the alcohol by distillation.

Also, it is well known that the process of sulfating fatty alcohols to yield alkyl sulfate surfactants also yields various impurities. The exact nature of these impurities depends on the conditions of sulfation and neutralization. Generally, however, the impurities of the sulfation process include one or more inorganic salts, unreacted fatty alcohol, and olefins ("The Effect of Reaction By-Products on the Viscosities of Sodium Lauryl Sulfate Solutions," *Journal of the American Oil Chemists' Society*, Vol. 55, No. 12, p. 909-913 (1978), C. F. Putnik and S. E. McGuire).

Alkoxylation impurities may include dialkyl ethers, polyalkylene glycol dialkyl ethers, olefins, and polyalkylene glycols. Impurities can also include the catalysts or components of the catalysts that are used in various steps.

Alkyl Ethoxy Sulfate

A liquid detergent composition can comprise from about 1% to about 30% by weight of the composition of a second surfactant composition an alkyl ethoxy sulfate (AES). The liquid detergent composition may also comprise from about 1%, 2%, 3%, 4%, 5%, 6%, 7%, 8%, 9%, or 10% to about 5%, 6%, 7%, 8%, 9%, 10%, 12%, 14%, 16%, 18%, 20%, 22%, 24%, 26%, 28%, or any combination thereof, by weight of the composition of an alkyl ethoxy sulfate. The AES surfactant comprises a plurality of AES compounds, where each AES compound comprises an alkyl chain. The alkyl chain of a particular AES compound may be characterized by the total number of carbons in the alkyl portion, otherwise known as the alkyl chain lengths. A given amount of AES surfactant may include a variety of AES compounds having chain lengths that fall within certain proportions or distributions. Thus, a given amount or sample of AES may be characterized by distributions of AES compounds having certain chain lengths, and/or by a weight average number of carbons in the alkyl portion.

Commercially available AES surfactants may include AES having weight average chain lengths of from twelve to fifteen, known as C12-15 AES, or chain lengths of from twelve to fourteen, known as C12-14 AES. While these are described as weight average chain lengths of a certain range, there could be materials within these which have carbon chain lengths outside of the specified range. As long as the weight average chain length of an AES material falls within the ranges as defined, the material is included in the scope even if there are some carbon chain lengths outside of the specified length.

Another AES surfactant suitable for use herein may include a relatively high proportion of an AES compound having fifteen carbon atoms in the alkyl chain ("C15 AES"). C15 AES may be desirable because the relatively longer alkyl chain increases the hydrophobicity of the AES surfactant, which may provide improved soil removal, such as greasy soil removal. The AES surfactant may include from about 40 wt %, or from about 45 wt %, to about 70 wt %, or to about 60 wt %, by weight of the AES surfactant, of C15 AES. C15 AES may make up a major portion of the AES surfactant, meaning that there is more C15 AES surfactant by weight present than any other single type of AES surfactant. C15 AES may make up at least half, or even a majority, of the AES surfactant by weight.

The AES surfactant may include an AES compound having fourteen carbon atoms in the alkyl chain ("C14 AES"), for example at least about 1 wt %, by weight of the AES surfactant, of C14 AES. The AES surfactant may include relatively limited amounts of C14 AES. For example, the AES surfactant may contain no more than about 30 wt %, or no more than about 25 wt %, or no more than about 20 wt %, or no more than about 15 wt %, or no more than about 10 wt %, by weight of the AES surfactant, of C14 AES. When a composition or surfactant system comprises a relatively large proportion of C15 AES, it may be desirable to limit the amount of C14 AES, e.g., for stability reasons.

The AES surfactant may include an AES compound having thirteen carbon atoms in the alkyl chain ("C13 AES"). C13 AES may be desirable because the relatively shorter alkyl chain decreases the relative hydrophobicity of the AES surfactant, enabling it to remove different soils and/or be relatively more physically stable than a more hydrophobic AES surfactant. The AES surfactant may include from about 15 wt %, or from about 20 wt %, or from about 25 wt %, to about 50 wt %, or to about 40 wt %, or to about 35 wt %, by weight of the AES surfactant, of C13 AES, preferably from about 15 wt % to about 35 wt %. C13 AES may be present as the first- or second-most prevalent AES compound in the AES surfactant; for example, the AES surfactant may be richest in C15 AES and C13 AES, having relatively high levels of both compared to AES of other chain lengths.

The AES surfactant may include an AES compound having twelve carbon atoms in the alkyl chain ("C12 AES"). The AES surfactant may contain at least about 1 wt %, or at least about 3 wt %, or at least about 5 wt %, or at least about 10 wt % of C12 AES. The AES surfactant may contain no more than about 20 wt %, or no more than about 15 wt %, or no more than about 12 wt %, or no more than about 10 wt %, or no more than about 5 wt %, of C12 AES. The AES surfactant may contain from about 1 wt %, or from about 3 wt %, to about 20 wt %, or to about 15 wt %, by weight of the AES surfactant, of C12 AES, preferably from about 3 wt % to about 15 wt %. C12 AES may be desirable, for example, to counterbalance the hydrophobicity of the C15 AES, resulting in a broader cleaning profile and/or a better stability profile.

The AES surfactant may include at least 1 wt %, by weight of the AES surfactant, of each of C12 AES, C13 AES, and C14 AES surfactant, in addition to the amounts of C15 surfactant recited above. The AES surfactant of the present disclosure may comprise from about 30 wt % to about 60 wt %, by weight of the AES surfactant, of C12 AES, C13 AES, C14 AES, or mixtures thereof, preferably mixtures thereof.

The AES surfactant may comprise from about 1 wt % to about 20 wt % C12 AES, from about 25 wt % to about 50 wt % C13 AES, from about 1 wt % to about 10 wt % C14 AES, and from about 45 wt % to about 60 wt % C15 AES, wherein each wt % is by weight of the AES surfactant, and may be characterized by alkyl chain lengths having an average molecular weight of from about 205 to about 220, preferably from about 208 to about 218; the provided wt %'s may add up to from about 95 wt % to about 100 wt %.

The AES surfactant may include an AES compound having sixteen carbon atoms in the alkyl chain ("C16 AES"). The amounts of C16 present may be limited, for example, because the longer chain length may contribute to phase instability. The AES surfactant of the present disclosure may comprise from about 0.1%, by weight of the AES surfactant, to less than about 5%, or less than about 3%, or less than about 1.5%, or less than 1%, by weight of the AES surfactant, of C16 AES.

The AES surfactant may be characterized by the weight average molecular weight of the chain lengths of the AES compounds in the distribution. The AES surfactant as a whole may be characterized by weight average molecular weight chain lengths that are lower than might be expected in view of the relatively high proportion of C15 AES.

The weight average molecular weight of the chain lengths may be determined by finding the weight average molecular weight of a fatty alcohol consisting of the alkyl chain and a hydroxyl group. Calculating the molecular weight of the chain lengths in such a fashion can present several advantages. For example, AES surfactants are typically synthesized from such fatty alcohols, which serve as a feedstock material before being alkoxylated (e.g., ethoxylated) and sulfated to arrive at the final AES compound(s). Thus, relevant information relating to the fatty alcohol feedstock is typically available from the feedstock supplier and/or the AES manufacturer. Additionally, reporting molecular weight based on a fatty alcohol comprising the alkyl chain rather than the molecular weight of the AES surfactant itself helps to remove uncertainty resulting from variable alkoxylation; for example, a C15 AES material may include some molecules that include one mole of ethoxylation, and others that include two moles and/or three moles of ethoxylation.

For example, the molecular weight of the alkyl chain of a C15 AES compound is based on a C15 fatty alcohol, which may have the following empirical formula: $C_{15}H_{31}OH$. Such a C15 fatty alcohol has a molecular weight of about 228 daltons. For convenience, Table 4 shows the molecular weight of several exemplary fatty alcohols.

TABLE 4

| Fatty Alcohol, by carbon chain length | Molecular Weight (in daltons) |
|---|---|
| C12 fatty alcohol | 186 |
| C13 fatty alcohol | 200 |
| C14 fatty alcohol | 214 |
| C15 fatty alcohol | 228 |
| C16 fatty alcohol | 242 |

The AES surfactant may be characterized by chain lengths having a weight average molecular weight of from about 200, or from about 205, or from about 208, or from about 210, or from about 211, from about 214, to about 220, or to about 218, or to about 215 daltons, wherein the molecular weight of a particular alkyl chain is based on the molecular weight of fatty alcohol comprising the alkyl chain (i.e., a fatty alcohol consisting of the alkyl chain and a hydroxyl group). The AES surfactant may be characterized by chain lengths having a weight average molecular weight of from about 200 to about 220, or from about 210 to about 220, from about 211 to about 220, or from about 211 to about 218 daltons. The AES surfactant may be characterized by chain lengths having a weight average molecular weight of from about 208 to no greater than 215 daltons. AES characterized by chain lengths of a relatively lower weight average molecular weight (e.g., 208-215 daltons) may be particularly preferred in detergent compositions having relatively higher amounts of surfactant (e.g., more than 20 wt %), as they facilitate improved physical stability.

AES surfactant may be characterized by their degrees of ethoxylation. In a population of AES compounds, the AES molecules may have varying degrees of ethoxylation. Thus, a given amount or sample of AES may be characterized by a weight average degree of ethoxylation, where the degree of ethoxylation is reported as moles of ethoxy groups ($—O—CH_2—CH_2$) per mole of AES. The AES surfactant of the present disclosure may be characterized by a weight average degree of ethoxylation of from about 0.5 to about 5, or from about 1 to about 3, from about 1.5 to about 3.0, or from about 1.5 to about 2.5.

The AES may include at least some alkyl sulfate ("AS") surfactant that is not ethoxylated. The unethoxylated AS may be present as a result of incomplete reactions during the ethoxylation process, and/or because it was added as a separate ingredient. For the purposes of the present disclosure, (unethoxylated) AS is considered to be part of the AES surfactant when determining levels, chain length molecular weights, and/or degrees of ethoxylation.

The AES surfactant may comprise AES compounds having linear alkyl chains, AES compounds having branched alkyl chains, or mixtures thereof. The AES surfactant may comprise AES surfactant that is branched at the C2 position, where the C2 is the second carbon away from the ethoxy sulfate head group (i.e., the carbon adjacent the ethoxy sulfate head group is at the C1 position). The AES surfactant may comprise from about 10% to about 30%, by weight of the AES surfactant, of AES surfactant that is branched at the C2 position. Branched alkyl chains may improve and/or broaden the cleaning profile of the AES surfactant. It may also be that linear alkyl portions of the AES compounds are preferred. At least about 50%, or at least about 75%, or at least about 90%, or at least about 95%, or about 100%, by weight of the AES surfactant, of the AES compounds may have alkyl chains that are linear alkyl chains. The AES may comprise a mixture of C15 AES compounds, where at least 60%, by weight of the C15 AES, of the C15 AES is linear, and at least 10%, by weight of the C15 AES, of the C15 AES is branched, preferably at the C2 position. The AES may comprise a mixture of C13 AES compounds, where at least 60%, by weight of the C13 AES, of the C13 AES is linear, and at least 10%, by weight of the C13 AES, of the C13 AES is branched, preferably at the C2 position.

As described above, AES compounds are typically manufactured by sulfating an ethoxylated fatty alcohol. A fatty alcohol may first be provided, then ethoxylated according to known methods. Thus, AES compounds, or at least the alkyl chains of the AES compounds, may be described in terms of the sources, for example oils or fatty alcohols, from which they are derived. The AES compounds of the present disclosure may include alkyl chains that are derived from a non-petroleum source, preferably from a natural source. The AES of the present disclosure may include mixtures of AES that includes alkyl chains that are naturally derived and AES that includes alkyl chains of AES that are synthetically derived (e.g., petrol-derived); such mixtures may be useful to account for supply chain variations, disruptions, and/or pricing fluctuations, e.g. so that a shortage of one type of AES may be back-filled by another type.

Natural sources may include oils derived from plants or animal sources, preferably from plants. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, castor oil, or mixtures thereof. Suitable feedstock oils may include metathesized oils, typically formed from a metathesis reaction in the presence of a suitable metathesis catalyst. The alkyl portion may be derived from coconut oil, palm kernel oil, or mixtures thereof, preferably from coconut oil, palm kernel oil, or mixtures thereof. Such sources may be desirable for environmental and/or sustainability reasons, as they do not rely on fossil fuels. Further, the alkyl chains of AES compounds derived from natural sources typically contain an even number of carbon atoms.

Other sources of alkyl chains (e.g., feedstock alcohols) may include commercially available alcohols, such as those sold by Shell (e.g., under the Neodol™ tradename, for example Neodol™ 23, Neodol™ 3, Neodol™ 45, and/or Neodol™ 5) and/or Sasol (e.g., Lial™, Isalchem™, Safol™, etc.).

It may be that the AES is not derived from a Fischer-Tropsch process. It may be that the AES of the present disclosure is derived from the well-known Shell modified oxo process. The AES of the present disclosure may include AES that is derived from the Ziegler process.

The AES may be present in acid form, in salt form (e.g., neutralized), or mixtures thereof. The salt-form AES may be an alkali metal salt, preferably a sodium salt, an ammonium salt, or an alkanolamine salt.

Additional Surfactants

The liquid detergent composition may further comprise an additional surfactant. The additional surfactant may be present at a level of about 0.25% to about 25% by weight of the liquid detergent composition. The additional surfactant may be anionic, nonionic, cationic, zwitterionic, amphoteric, or a combination thereof. For example, the additional surfactant may be a combination of linear alkyl benzene sulfonate and a nonionic surfactant or an anionic surfactant and a nonionic surfactant comprising an ethoxylated alcohol. The additional surfactant may be selected from alkyl benzene sulfonate, ethoxylated alcohol nonionic surfactant, amine oxide, methyl ester sulfonate, glycolipid surfactant, alkylpolyglucoside surfactant, or combinations thereof. The additional surfactant may be selected from the group consisting of an alkyl benzene sulfonate, an ethoxylated alcohol nonionic surfactant, an amine oxide surfactant, and mixtures thereof.

The additional surfactant may comprise alkyl benzene sulfonate surfactant. The alkyl group may contain about 9 to about 15 carbon atoms. Such linear alkylbenzene sulfonates are known as "LAS." The linear alkylbenzene sulfonate may have an average number of carbon atoms in the alkyl group of from about 10 to 13, from about 11 to about 12, or from about 11.6 to about 12. The linear straight chain alkyl benzene sulfonates may have an average number of carbon atoms in the alkyl group of about 11.8 carbon atoms, which may be abbreviated as C11.8 LAS. The alkyl benzene sulfonate may be present, at least partly, as a salt, such as an alkali metal salt, preferably a sodium salt, or an amine salt, such as an ethanolamine salt, e.g., a monoethanolamine salt.

Suitable alkyl benzene sulfonate (LAS) is obtainable, preferably obtained, by sulfonating commercially available linear alkyl benzene (LAB). Suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic surfactant is alkyl benzene sulfonate that is obtained by DETAL catalyzed process, DETAL-PLUS catalyzed process, although other synthesis routes, such as HF, and other alkylation catalysts such as zeolites ZSM-4, ZSM-12, ZSM-20, ZSM-35, ZSM-48, ZSM-50, MCM-22, TMA offretite, TEA mordenite, clinoptilolite, mordenite, REY and zeolite Beta may also be suitable. In one aspect a magnesium salt of LAS is used. Preferably, the HLAS surfactant may be selected from alkyl benzene sulfonic acids, alkali metal or amine salts of C10-16 alkyl benzene sulfonic acids, more preferably C10 to C14 alkyl benzene sulfonic acids. The LAS surfactant can comprise greater than 50% C12, preferably greater than 60%, preferably greater than 70% C12, more preferably greater than 75%. Preferably, the HLAS surfactants may be selected from alkyl benzene sulfonic acids, alkali metal salts of C10-16 alkylbenzene sulfonic acids, wherein the HLAS surfactant comprises a ratio of even carbons to odd carbons of 3:2 to 99:1 The additional surfactant may comprise an alkyl sulfate. The alkyl sulfate may comprise sodium lauryl sulfate, ammonium lauryl sulfate, or a combination thereof.

The additional surfactant may comprise an amine oxide surfactant. Preferred amine oxides are alkyl dimethyl amine oxide or alkyl amido propyl dimethyl amine oxide, more preferably alkyl dimethyl amine oxide and especially coco dimethyl amino oxide. Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N(R2)(R3) O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The compositions of the present disclosure may include from about 0.1% to about 5%, or to about 3%, or to about 1%, by weight of the composition, of amine oxide.

The additional surfactant may comprise a nonionic surfactant. The nonionic surfactant may be an ethoxylated alcohol. The nonionic surfactant may have the formula $R(OC_2H_4)_nOH$, wherein R is selected from the group consisting of aliphatic hydrocarbon radicals containing from about 8 to about 16 carbon atoms and the average value of n is from about 5 to about 15. For example, the nonionic surfactant may be selected from ethoxylated alcohols having an average of about 12-14 carbon atoms in the alcohol (alkyl) portion and an average degree of ethoxylation of about 7-9 moles of ethylene oxide per mole of alcohol.

Additional non limiting examples include ethoxylated alkyl phenols of the formula $R(OC_2H_4)_nOH$, wherein R comprises an alkyl phenyl radicals in which the alkyl groups contain from about 8 to about 12 carbon atoms, and the average value of n is from about 5 to about 15, $C_{12}$-$C_{18}$ alkyl ethoxylates, such as, NEODOL® nonionic surfactants from Shell; $C_{14}$-$C_{22}$ mid-chain branched alcohols; $C_{14}$-$C_{22}$ mid-chain branched alkyl ethoxylates, $BAE_x$, wherein x is from 1 to 30. The nonionic ethoxylated alcohol surfactant herein may further comprise residual alkoxylation catalyst, which may be considered residue from the reaction or an impurity. It may further comprise various impurities or by-products of the alkoxylation reaction. The impurities may vary depending on the catalyst used and the conditions of the reaction. Impurities include alkyl ethers, e.g., dialkyl ethers, such as, didodecyl ether, glycols, e.g., diethylene glycol, triethylene glycol, pentaethylene glycol, other polyethylene glycols.

The nonionic ethoxylated alcohol may be a narrow range ethoxylated alcohol. A narrow range ethoxylated alcohol may have the following general formula (I):

$$R-\left[OCH_2CH_2\right]_n-OH$$

where R is selected from a saturated or unsaturated, linear or branched, $C_8$-$C_{20}$ alkyl group and where greater than 90% of n is $0 \leq n \leq 15$. In addition, the average value of n can be between about 6 to about 10, where less than about 10% by weight of the alcohol ethoxylate are ethoxylates having n<7 and between 10% and about 20% by weight of the alcohol ethoxylate are ethoxylates having n=8.

The composition may comprise an average value of n of about 10. The composition may have the following ranges for each of the following n: n=0 of up to 5%, each of n=1, 2, 3, 4, 5 of up to 2%, n=6 of up to 4%, n=7 of up to 10%, n=8 of between 12% and 20%, n=9 of between 15% and 25%, n=10 of between 15% to 30%, n=11 of between 10% and 20%, n=12 of up to 10%, and n>12 at up to 10%. The composition may have n=9 to 10 of between 30% and 70%. The composition may have greater than 50% of its composition made up of n=8 to 11.

The alcohol ethoxylates described herein are typically not single compounds as suggested by their general formula (I), but rather, they comprise a mixture of several homologs having varied polyalkylene oxide chain length and molecular weight. Among the homologs, those with the number of total alkylene oxide units per mole of alcohol closer to the most prevalent alkylene oxide adduct are desirable; homologs whose number of total alkylene oxide units is much lower or much higher than the most prevalent alkylene oxide adduct are less desirable. In other words, a "narrow range" or "peaked" alkoxylated alcohol composition is desirable. A "narrow range" or "peaked" alkoxylated alcohol composition refers to an alkoxylated alcohol composition having a narrow distribution of alkylene oxide addition moles.

A "narrow range" or "peaked" alkoxylated alcohol composition may be desirable for a selected application. Homologs in the selected target distribution range may have the proper lipophilic-hydrophilic balance for a selected application. For example, in the case of an ethoxylated alcohol product comprising an average ratio of 5 ethylene oxide (EO) units per molecule, homologs having a desired lipophilic-hydrophilic balance may range from 2EO to 9EO. Homologs with shorter EO chain length (<2EO) or longer EO chain length (>9EO) may not be desirable for the applications for which a =5 EO/alcohol ratio surfactant is ordinarily selected since such longer and shorter homologs are either too lipophilic or too hydrophilic for the applications utilizing this product. Therefore, it is advantageous to develop an alkoxylated alcohol having a peaked distribution.

The narrow range of alkoxylated alcohol compositions of the disclosure may have an average degree of ethoxylation ranging from about 0 to about 15, such as, for example, ranging from about 4 to about 14, from about 5-10, from about 8-11, and from about 6-9. The narrow range alkoxylated alcohol compositions of the disclosure may have an average degree of ethoxylation of 10. The narrow range alkoxylated alcohol compositions of the disclosure may have an average degree of ethoxylation of 9. The narrow range alkoxylated alcohol compositions of the disclosure may have an average degree of ethoxylation of 5.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium surfactants; dimethyl hydroxyethyl lauryl ammonium chloride; polyamine cationic surfactants; cationic ester surfactants; and amino surfactants, such as amido propyldimethyl amine (APA). The compositions of the present disclosure may be substantially free of cationic surfactants and/or of surfactants that become cationic below a pH of 7 or below a pH of 6, as cationic surfactants may negatively interact with other components, such as anionic surfactants.

Examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. The zwitterionic surfactants may comprise betaines, including alkyl dimethyl betaine, cocodimethyl amidopropyl betaine, and $C_8$ to $C_{18}$ (for example from $C_{12}$ to $C_{18}$) amine oxide and sulfo and hydroxy betaines, such as N-alkyl-N,N-dimethylammino-1-propane sulfonate where the alkyl group can be from $C_8$ to $C_{18}$ or from $C_{10}$ to $C_{14}$.

Detergent Adjunct

The liquid detergent composition can comprise one or more adjunct ingredients at a level, for example, of about 0.1% to about 50%. Adjunct ingredients can include, for example, color care agents; organic solvents; aesthetic dyes; hueing dyes; leuco dyes; opacifiers such as those commercially available under the Acusol tradename, brighteners including FWA49, FWA15, and FWA36; dye transfer inhibitors including PVNO, PVP and PVPVI dye transfer inhibitors; builders including citric acid- and fatty acids; chelants; enzymes; perfume capsules; preservatives; antioxidants including sulfite salts such as potassium sulphite or potassium bisulphite salts and those commercially available under the Ralox brand name; antibacterial and anti-viral agents including 4.4'-dichloro 2-hydroxydiphenyl ether such as Tinosan HP100 available from the BASF company; anti-mite actives such as benzyl benzoate; structuring agents including hydrogenated castor oil; silicone based anti-foam materials; electrolytes including inorganic electrolytes such as sodium chloride, potassium chloride, magnesium chloride, and calcium chloride, and related sodium, potassium, magnesium and calcium sulphate salts, as well as organic electrolytes such as sodium, potassium, magnesium and calcium salts of carbonate, bicarbonate, carboxylates such as formate, citrate and acetate; pH trimming agents including sodium hydroxide, hydrogen chloride, and alkanolamines including monoethanolamine, diethanolamine, triethanolamine, and monoisopropanolamine; a probiotic; a hygiene agent such as zinc ricinoleate, thymol, quaternary ammonium salts such as Bardac®, polyethylenimines (such as Lupasol® from BASF) and zinc complexes thereof, silver and silver compounds, a cationic biocide including octyl decyl dimethyl ammonium chloride, dioctyl dimethyl ammonium chloride, didecyl dimethyl ammonium chloride, dispersant, cleaning polymer, glucan, or a mixture thereof. For example, the detergent adjunct comprises an enzyme, an enzyme stabilizer, a builder, a hueing agent, anti-soil redeposition agent, a bleach, or a combination thereof.

The organic solvent can include an alcohol and/or a polyol. For example, the organic solvent can comprise ethanol, propanol, isopropanol, a sugar alcohol, a glycol, a glycol ether, or a combination thereof. The organic solvent can comprise polyethylene glycol, especially low molecular weight polyethylene glycols such as PEG 200 and PEG 400; diethylene glycol; glycerol; 1,2-propanediol; polypropylene glycol including dipropylene glycol and tripropylene glycol and low molecular weight polypropylene glycols such as PPG400; or a mixture thereof.

The chelant can comprise, for example, EDDS, HEDP, GLDA, DTPA, DTPMP, DETA, EDTA, MGDA or a mixture thereof. The chelant can be biodegradable. Biodegradable chelants can include, for example, NTA, IDS, EDDG, EDDM, HIDS, HEIDA, HEDTA, DETA, or a combination thereof.

The enzyme can comprise, for example, protease, amylase, cellulase, mannanase, lipase, xyloglucanase, pectate lyase, nuclease enzyme, or a mixture thereof.

Cleaning polymers can include, for example, those which can help clean stains or soils on clothing and/or help prevent those soils from redepositing on clothing during the wash. Examples are optionally modified carboxymethylcellulose, modified polyglucans, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from 0.005 to 10 wt %, generally from 0.5 to 8 wt %.

Water

The detergent composition may also include water. Water can be present, for example, at a level of about 5% to about 95%, by weight of the composition.

pH

The detergent composition may have a pH of about 5.0 to about 12, preferably 6.0-10.0, more preferably from 8.0 to 10. wherein the pH of the detergent composition is measured as a 10% dilution in demineralized water at 20° C.

Viscosity

A liquid detergent composition can be in the form of an aqueous solution or uniform dispersion or suspension. Such a solution, dispersion or suspension will be acceptably phase stable. A liquid detergent composition can have a viscosity from 1 to 1500 centipoises (1-1500 mPa*s), more preferably from 100 to 1000 centipoises (100-1000 mPa*s), and most preferably from 200 to 500 centipoises (200-500 mPa*s) at 20 s-1 and 21° C. Viscosity can be determined by conventional methods. Viscosity may be measured using an AR 550 rheometer from TA instruments using a plate steel spindle at 40 mm diameter and a gap size of 500 µm. The high shear viscosity at 20 s-1 and low shear viscosity at 0.05-1 can be obtained from a logarithmic shear rate sweep from 0.1-1 to 25-1 in 3 minutes time at 21° C. The preferred rheology described therein may be achieved using internal existing structuring with detergent ingredients or by employing an external rheology modifier. More preferably the laundry care compositions, such as detergent liquid compositions have a high shear rate viscosity of from about 100 centipoise to 1500 centipoise, more preferably from 100 to 1000 cps.

Composition MAKING

The liquid compositions can be prepared, for example, by combining the components thereof in any convenient order and by mixing, e.g., agitating, the resulting component combination to form a phase stable liquid laundry care composition. In a process for preparing such compositions, a liquid matrix can be formed containing at least a major proportion, or even substantially all, of the liquid components, e.g., nonionic surfactant, the non-surface-active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Combinations

1. A liquid detergent composition comprising:
   a) from about 1% to about 30%, preferably from about 1% to about 10%, by weight of the composition of a first surfactant consisting essentially of a mixture of surfactant isomers of Formula I and surfactants of Formula II:

Formula 1

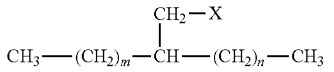

Formula 2

$$CH_3-(CH_2)_{m+n+3}-X$$

$6 \le m \le 11;$
$0 \le n \le 5;$ wherein from about 0 to about 0 by weight of the first surfactant are isomers having m+n=11; wherein between about 25% to about 50% of the mixture of surfactant isomers of Formula I have n=0; wherein from about 0.001% to about 25% by weight of the first surfactant are surfactants of Formula II; and wherein X is a hydrophilic moiety;
   b) from about 1% to about 30%, preferably from about 1% to about 10%, by weight of the composition of a second surfactant comprising a $C_{12}$-$C_{16}$ alkyl ethoxy sulfate with an average degree of ethoxylation of about 1.5 to about 3; and
   c) a detergent adjunct.
2. The liquid detergent composition of 1, wherein the liquid detergent composition has a greater stain removal score versus the combination of scores of a first reference composition comprising the first surfactant and a second reference composition comprising the second surfactant.
3. The liquid detergent composition of any of 1-2, wherein the stain comprises make-up, dust sebum, discriminative sebum, cooked beef, bacon grease, grass, or American tea.
4. The liquid detergent composition of any of 1-3, wherein the ratio by weight of the first surfactant to the second surfactant is from about 15:1 to about 1:5, preferably from about 10:1 to about 1:2, more preferably from about 1:1.
5. The liquid detergent composition of any of 1-4, further comprising an additional surfactant comprising a nonionic surfactant, an anionic surfactant, or a combination thereof.
6. The liquid detergent composition of 5 wherein the additional surfactant comprises a combination of linear alkyl benzene sulfonate and a nonionic surfactant.
7. The liquid detergent composition of 5, wherein the additional surfactant comprises an anionic surfactant and a nonionic surfactant comprising an ethoxylated alcohol.
8. The liquid detergent composition of any of 1-7, wherein the detergent adjunct comprises an enzyme, an enzyme stabilizer, a builder, a hueing agent, anti-soil redeposition agent, a bleach, or a combination thereof.
9. The liquid detergent composition of any of 1-8, wherein the composition has an actual stain removal index which is 0.5 or more greater than that of an expected stain removal index.
10. The liquid detergent composition of 9, wherein the stain removal is measured on dust sebum, discriminative sebum, cooked beef, bacon grease, grass, or American tea.
11. The liquid detergent composition of any of 1-10, wherein the $C_{12}$-$C_{16}$ alkyl ethoxy sulfate has an alkyl chain with a weight average molecular weight of about 211 to about 220 daltons.
12. The liquid detergent composition of any of 1-11, wherein between about 15% to about 40% by weight of the first surfactant, of the mixture of surfactant isomers of Formula I have n=1.
13. The liquid detergent composition of any of 1-12, wherein about 60% to about 90% by weight of the first surfactant, of the mixture of surfactant isomers of Formula I have n<3.
14. The liquid detergent composition of any of 1-13, wherein about 90% to about 100%, by weight of the first surfactant, surfactant isomers having m+n=11.
15. The liquid detergent composition of any of 1-14, wherein the $C_{12}$-$C_{16}$ alkyl ethoxy sulfate has an alkyl chain with a weight average molecular weight of about 211 to about 220 daltons.
16. The liquid detergent composition of any of 1-15, wherein the stain removal index is measured on a cotton swatch.

EXAMPLES

Example 1: Preparation of a Branched C15 Alcohol Product

The homogeneous rhodium organophosphorus catalyst used in this example is prepared in a high pressure, stainless steel stirred autoclave. To the autoclave was added 0.027 wt. % Rh(CO)2ACAC ((Acetylacetonato)dicarbonylrhodium (I)), 1.36 wt. % tris (2,4,-di-t-butylphenyl) phosphite ligand and 98.62 wt. % Synfluid® PAO 4 cSt (Chevron Phillips Chemical Company LP, P.O. Box 4910, The Woodlands, TX 77387-4910, phone (800) 231-3260) inert solvent. The mixture was heated at 80° C. in the presence of a CO/H2 atmosphere and 2 bar(g) pressure for four hours to produce the active rhodium catalyst solution (109 ppm rhodium, P:Rh molar ratio=20). A C14 linear alpha olefin feedstock (1-Tetradecene) from the Chevron Phillips Chemical Company LP, (AlphaPlus® 1-Tetradecene by Chevron Phillips Chemical Company LP, P.O. Box 4910, The Woodlands, TX 77387-4910, phone (800) 231-3260) was added. The resulting mixture had a rhodium concentration of approximately 30 ppm. The 1-tetradecene linear alpha olefin was then isomerized at 80° C. in the presence of a CO/H2 atmosphere and 1 bar(g) pressure for 12 hours. The isomerized olefin was then hydroformylated at 70° C. in the presence of a CO/H2 atmosphere and 20 bar(g) pressure for 8 hours. The resulting reaction product was flash distilled at 150-160° C. and 25 millibar to recover the rhodium catalyst solution as a bottoms product and recover a branched C15 Aldehyde overheads product. The recovered rhodium catalyst solution was then used again to complete a second 1-tetradecene batch isomerization (4 hours) and hydroformylation (6 hours). The resulting C15 aldehyde products from the two batches were combined to give a branched C15 Aldehyde product comprising:

| | Weight % |
|---|---|
| 1-Pentadecanal | 12.1% |
| 2-Methyl-tetradecanal | 34.1% |
| 2-Ethyl-tridecanal | 21.9% |
| 2-Propyl-dodecanal | 14.0% |
| 2-Butyl-undecanal | 8.6% |
| 2-Pentyl-decanal + 2-hexyl-decanal | 9.0% |
| TOTAL | 99.6% |

The weight % branching in the branched C15 aldehyde product was 87.8%.

The branched C15 aldehyde product was hydrogenated in a high pressure, Inconel 625 stirred autoclave at 150 C and 20 bar(g) hydrogen pressure. The hydrogenation catalyst used was a Raney® Nickel 3111 (W. R. Grace & Co., 7500 Grace Drive, Columbia, MD 21044, US, phone 1-410-531-4000) catalyst used at a 0.25 wt. % loading. The aldehyde was hydrogenated for 10 hours and the resultant reaction mixture was filtered to produce a branched C15 alcohol product comprising:

| | Weight % |
|---|---|
| 1-Pentadecanol | 13.7% |
| 2-Methyl-tetradecanol | 32.6% |
| 2-Ethyl-tridecanol | 21.7% |
| 2-Propyl-dodecanol | 12.4% |
| 2-Butyl-undecanol | 8.0% |
| 2-Pentyl-decanol + 2-hexyl-decanol | 9.0% |
| Other | 2.7% |

The weight % 2-alkyl branching in the branched C15 alcohols product was 83.6%.

Example 2. Synthesis of Narrow Branched Pentadecanol (C15) Sulfate Using a Falling Film Sulfation Reactor (Branched Alkyl Sulfate Example Z)

The alcohol from Example 1 is sulfated in a falling film using a Chemithon single 15 mm×2 m tube reactor using S03 generated from a sulfur burning gas plant operating at 5.5 lb/hr sulfur to produce 3.76% S03 on a volume basis. Alcohol feed rate is 17.4 kg/hour and feed temperature was 83 F. Conversion of the alcohol to alcohol sulfate acid mix was achieved with 97% completeness. Neutralization with 50% sodium hydroxide is completed at ambient process temperature to 0.54% excess sodium hydroxide. 30 gallons of sodium neutralized C15 narrow branched Alcohol Sulfate paste. Analyses by standard Cationic S03 titration method determines final average product activity to be 74.5%. The average unsulfated level is 2.65% w/w.

TABLE 5

Alkyl chain distribution of C15 Alkyl Sulfates based on starting distribution of alcohol

| | Neodol ® 5 (ex Shell) | C15 Alcohol from U.S. Pat No. 9,493,725 (ex Sasol) | Branched alkyl sulfate Example Z made from Example 1 C15 Alcohol |
|---|---|---|---|
| Linear C15* | 79.3 | 8.6 | 13.7 |
| 2-Alkyl Branched C15 | 17.5 | 89.5 | 83.6 |
| Other* | 3.2 | 1.9 | 2.7 |
| 2-methyl* | 7.0 | 19.0 | 32.6 |
| 2-ethyl* | 2.8 | 12.0 | 21.7 |
| 2-propyl* | 1.9 | 12.7 | 12.4 |
| 2-butyl* | 2.0 | 14.6 | 8.0 |
| 2-pentyl + 2-hexyl* | 3.8 | 31.2 | 9.0 |
| 2-Alkyl Branch Distribution | | | |
| 2-methyl** | 39.9% | 21.2% | 38.9% |
| 2-ethyl** | 16.2% | 13.4% | 25.9% |
| 2-propyl** | 10.7% | 14.2% | 14.9% |
| 2-butyl** | 11.3% | 16.3% | 9.5% |
| 2-pentyl + 2-hexyl** | 21.9% | 34.9% | 10.7% |

*by weight of starting alcohol

**by weight of 2-alkyl branched C15 alcohol

Formulation Examples

| Raw Material | Comparative Comp. A (chassis) | Comparative Comp. B | Comparative Comp. C | Comparative Comp. D | Comparative Comp. E |
|---|---|---|---|---|---|
| | % active in formulation | | | | |
| Alkyl Ethoxy Sulfate [1] | — | 2.11 | — | 4.23 | — |
| Branched Alkyl Sulfate[2] | — | — | 2.11 | — | 4.23 |
| HLAS[3] | 4.02 | 4.02 | 4.02 | 4.02 | 4.02 |
| NI[4] | 4.96 | 4.96 | 4.96 | 4.96 | 4.96 |
| Amine oxide[5] | 1.67 | 1.67 | 1.67 | 1.67 | 1.67 |
| Citric acid[6] | 1.51 | 1.51 | 1.51 | 1.51 | 1.51 |
| Protease[7] | 0.06 | 0.06 | 0.06 | 0.06 | 0.06 |
| Amylase[8] | 0.01 | 0.01 | 0.01 | 0.01 | 0.01 |
| Borate[9] | 1.00 | 1.00 | 1.00 | 1.00 | 1.00 |
| Ethoxylated polyethylene-imine[10] | 2.14 | 2.14 | 2.14 | 2.14 | 2.14 |
| Misc (water, solvent, etc.) | Balance | Balance | Balance | Balance | Balance |

| Raw Material | Comparative Comp. F | Comparative Comp. G | Inventive Comp. 1 | Inventive Comp. 2 | Inventive Comp. 3 |
|---|---|---|---|---|---|
| | % active in formulation | | | | |
| Alkyl Ethoxy Sulfate [1] | 8.46 | — | 2.11 | 4.23 | 8.46 |
| Branched Alkyl Sulfate [2] | — | 8.46 | 2.11 | 4.23 | 8.46 |
| HLAS[3] | 4.02 | 4.02 | 4.02 | 4.02 | 4.02 |
| NI[4] | 4.96 | 4.96 | 4.96 | 4.96 | 4.96 |
| Amine oxide[5] | 1.67 | 1.67 | 1.67 | 1.67 | 1.67 |
| Citric acid[6] | 1.51 | 1.51 | 1.51 | 1.51 | 1.51 |
| Protease[7] | 0.06 | 0.06 | 0.06 | 0.06 | 0.06 |
| Amylase[8] | 0.01 | 0.01 | 0.01 | 0.01 | 0.01 |
| Borate[9] | 1.00 | 1.00 | 1.00 | 1.00 | 1.00 |
| Ethoxylated polyethylene-imine[10] | 2.14 | 2.14 | 2.14 | 2.14 | 2.14 |
| Misc (water, solvent, etc.) | Balance | Balance | Balance | Balance | Balance |

| Raw Material | Inventive Composition 4 % wt | Inventive Composition 5 % wt | Inventive Composition 6 % wt | Inventive Composition 7 % wt | Inventive Composition 8 % wt | Inventive Composition 9 % wt |
|---|---|---|---|---|---|---|
| Branched Alkyl Sulfate[2] | 6 | 6 | 10 | 4 | 4 | 10.5 |
| Sodium Lauryl Sulfate[11] | 3 | 5.3 | 3 | 0 | 0 | 0 |
| HLAS[3] | 5 | 12 | 8.5 | 1.5 | 12 | 1 |
| AE3S Ethoxylated alkylsulphate with an average degree of ethoxylation of 3 | 1 | 3 | 0 | 9 | 0 | 0 |
| Alkyl ethoxy sulfate[1] | 0 | 0 | 0 | 0 | 3.1 | 0 |
| amine oxide[5] | 0 | 1 | 1.5 | 0.5 | 0.7 | 0 |
| C24 alkyl ethoxylate (EO7) | 5 | 12 | 12 | 13 | 7 | 0 |
| NI[4] | 0 | 0 | 0 | 0 | 0 | 2 |
| citric acid[6] | 1.8 | 2 | 6.8 | 0.2 | 3.7 | 8.4 |
| palm kernel fatty acid | 0 | 0.5 | 1 | 3 | 0 | 0 |
| topped kernel fatty acid | 0 | 0.1 | 0 | 0 | 2.9 | 0 |

-continued

| Raw Material | Inventive Composition 4 % wt | Inventive Composition 5 % wt | Inventive Composition 6 % wt | Inventive Composition 7 % wt | Inventive Composition 8 % wt | Inventive Composition 9 % wt |
|---|---|---|---|---|---|---|
| Enzyme 1 | 0.0017 | 0 | 0.005 | 0.0017 | 0.0017 | 0.0017 |
| Enzyme 2 | 0.00342 | 0.00342 | 0.00342 | 0.00342 | 0.00342 | 0.00342 |
| Enzyme 3 | 0.00766 | 0 | 0.023 | 0.00766 | 0.00766 | 0.00766 |
| Enzyme 4 | 0.07706 | 0 | 0.07706 | 0.07706 | 0.07706 | 0.07706 |
| Enzyme 5 | 0 | 0.001 | 0.003 | 0 | 0 | 0 |
| Enzyme 6 | 0.012 | 0 | 0 | 0.012 | 0 | 0.01 |
| Enzyme 7 | 0.006 | 0.01 | 0.03 | 0 | 0 | 0.01 |
| borax | 1.1 | 1.7 | 3 | 0.1 | 0 | 0 |
| Misc (water, brightener, solvent, cleaning polymer, etc.) | Balance | Balance | Balance | Balance | Balance | Balance |

[1]C12-15EO2.5S AlkylethoxySulfate where the alkyl portion of AES has a molecular weight of 211 to 218 daltons, available from P&G Chemicals;
[2]branched alkyl sulfate Example Z;
[3]High C12 (96%)Linear Alkyl Benzene Sulfonate sourced from P&G Chemicals;
[4]Surfonic L24-9 commercially available from Huntsman;
[5]C12/C14 Amine Oxide sourced from P&G Chemicals;
[6]Citrosol 502 commercially available from Archer Daniels Midland;
[7]Preferenz commercially available from DuPont;
[8]Artic commercially available from Novozymes;
[9]Disodium tetraborate pentahydrate commercially sourced from Univar solutions;
[10]PE-20 commercially available from BASF;
[11]Sodium lauryl sulfate available from P&G Chemicals The comparative and inventive examples are prepared by combining all raw materials to achieve Comparative Composition A, with exception of not adding all of the water to leave space (referred to as a hole) to add in the branched alkyl sulfate and alkyl ethoxy sulfate for Comparative Compositions B-G and Inventive Compositions 1-3. To make Comparative Composition A, the following raw materials were mixed rapidly to achieve a vortex with a mixing impeller for about 60 minutes: some water, solvent, surfactant (any surfactant not the branched alkyl sulfate or the alkyl ethoxy sulfate), borax, stabilizer, neutralizer, builder, chelant, polymer, and enzyme to result in a stable one phase liquid.

To make Comparative Compositions B-G and Inventive Compositions 1-3, the branched alkyl sulfate and alkyl ethoxy sulfate were added on top of Comparative Composition A (with the hole) to achieve the desired levels. Before remaining water was added to balance the formulas, caustic or sulfuric was added to achieve a consistent pH of 8.2-8.6.

Inventive Compositions 4-9 can be made by rapidly mixing the following materials to achieve a vortex with a mixing impeller for about 60 minutes: some water, solvent, surfactant, borax, stabilizer, neutralizer, builder, chelant, polymer, and enzyme to result in a stable one phase liquid. Before remaining water is added to balance the formulas, caustic or sulfuric was added to achieve a consistent pH of 8.2-8.6.

Methods

Stain Removal Index Method

The method involves the use of a tergotometer to simulate the washing of fabrics in a washing machine. Test formulations were used to wash the test fabrics together with clean knitted cotton ballast and eleven 6 cm×6 cm SBL2004 soil squares (60 g). SBL2004 sheets were purchased from WFK Testgewebe GmbH and were cut into 6 cm×6 cm squares. The wash tests consisted of two internal and four external replicates for each stain type and treatments A-J described below (Table 4). The total amount of liquid detergent used in the test was 2.36 grams Tergotometer pots containing 1 L of the test wash solution plus test fabrics, soil squares, and ballast at 25° C. and 7 US gpg were agitated at 208 rpm for 12 minutes and spun dry. Fabrics were then rinsed in 15° C. water at 7 US gpg at 167 rpm for 5 minutes and spun dry. After the rinse, fabrics were machine dried on High for 70 minutes before being analysed. Image analysis was used to compare each stain to an unstained fabric control. Software converted images taken into standard colorimetric values and compared these to standards based on the commonly used Macbeth Colour Rendition Chart, assigning each stain a colorimetric value (Stain Level). Eight replicates of each were prepared. Stain removal index scores for each stain can be calculated. Stain removal from the swatches was measured as follows:

$$\text{Stain Removal Index } (SRI) = \frac{\Delta E_{inital} - \Delta E_{washed}}{\Delta E_{initial}} \times 100$$

$\Delta E_{initial}$=Stain level before washing, calculated from the difference between the standard L*, a* and b* colorimetric measurement of the unwashed stain and unwashed background fabric, while $\Delta E_{washed}$=Stain level after washing, calculated from the difference between the standard L*, a* and b* colorimetric measurement of the washed stain and unwashed background fabric. Technical stain swatches of CW120 cotton containing Discriminative Sebum (PCS132), ASTM Dust Sebum (PCS94), American Lipton Tea (GSRTLIT001), Covergirl Makeup (GSRTCGM001), Cooked Beef (GSRTCB001), Dyed Bacon Grease (GSRTBGD001), and Grass (GSRTGR001) can be purchased from Accurate Product Development (Fairfield, OH).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid detergent composition comprising:

a) from about 1% to about 30%, by weight of the composition of a first surfactant consisting essentially of a mixture of surfactant isomers of Formula 1 and surfactants of Formula 2:

Formula 1

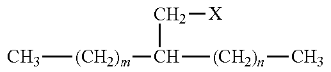

Formula 2

$CH_3—(CH_2)_{m+n+3}—X$ $6 \leq m \leq 11$;
$0 \leq n \leq 5$;

wherein from about 50% to about 100% by weight of the first surfactant are isomers having m+n=11;

wherein between about 25% to about 50% of the mixture of surfactant isomers of Formula 1 have n=0; wherein from about 0.001% to about 25% by weight of the first surfactant are surfactants of Formula 2; and wherein X is a hydrophilic moiety;

b) from about 1% to about 30%, by weight of the composition of a second surfactant comprising a $C_{12}$-$C_{16}$ alkyl ethoxy sulfate with an average degree of ethoxylation of about 1.5 to about 3;

where each $C_{12}$-$C_{16}$ alkyl ethoxy sulfate comprises an alkyl chain;

wherein the second surfactant comprises from about 40 wt % to about 70 wt %, by weight of the second surfactant, of the $C_{12}$-$C_{16}$ alkyl ethoxy sulfate having fifteen carbon atoms in the alkyl chain;

wherein the second surfactant comprises no more than about 30 wt %, by weight of the second surfactant, of the $C_{12}$-$C_{16}$ alkyl ethoxy sulfate an alkyl ethoxylated sulfate having fourteen carbon atoms in the alkyl chain;

wherein the second surfactant comprises from about 15% to about 50%, by weight of the second surfactant, of the $C_{12}$-$C_{16}$ alkyl ethoxy sulfate having thirteen carbon atoms in the alkyl chain; and c) a detergent adjunct.

2. The liquid detergent composition of claim 1, wherein the liquid detergent composition has a greater stain removal score versus the combination of scores of a first reference composition comprising the first surfactant and a second reference composition comprising the second surfactant.

3. The liquid detergent composition of claim 2, wherein the stain comprises make-up, dust sebum, discriminative sebum, cooked beef, bacon grease, grass, or American tea.

4. The liquid detergent composition of claim 3, wherein the ratio by weight of the first surfactant to the second surfactant is from about 10:1 to about 1:2.

5. The liquid detergent composition of claim 3, wherein the ratio by weight of the first surfactant to the second surfactant in about 1:1.

6. The liquid detergent composition of claim 4, further comprising an additional surfactant comprising a nonionic surfactant, an anionic surfactant, or a combination thereof.

7. The liquid detergent composition of claim 6, wherein the additional surfactant comprises a combination of linear alkyl benzene sulfonate and a nonionic surfactant.

8. The liquid detergent composition of claim 6, wherein the additional surfactant comprises an anionic surfactant and a nonionic surfactant comprising an ethoxylated alcohol.

9. The liquid detergent composition of claim 4, wherein the detergent adjunct comprises an enzyme, an enzyme stabilizer, a builder, a hueing agent, anti-soil redeposition agent, a bleach, or a combination thereof.

10. The liquid detergent composition of claim 1, wherein the composition has an actual stain removal index which is 0.5 or more greater than that of an expected stain removal index, the expected stain removal index representing the summation of stain removal indexes of a first reference composition representing the liquid detergent composition without the second surfactant and a second reference composition representing the liquid detergent without the first surfactant.

11. The liquid detergent composition of claim 10, wherein the stain removal is measured on dust sebum, discriminative sebum, cooked beef, bacon grease, grass, or American tea.

12. The liquid detergent composition of claim 1, wherein the alkyl chain has a weight average molecular weight of about 211 to about 220 daltons.

13. A liquid detergent composition, comprising:

a) a first surfactant consisting essentially of a mixture of surfactant isomers of Formula 1 and surfactants of Formula 2:

Formula 1

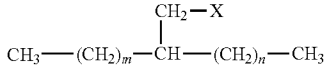

$6 < m < 11$;
$0 < n < 5$;

Formula 2

$CH_3—(CH_2)_{m+n+3}—X$ wherein from about 50% to about 100% by weight of the first surfactant are isomers having m+n=11;

wherein between about 25% to about 50% of the mixture of surfactant isomers of Formula 1 have n=0;

wherein from about 0.001% to about 25% by weight of the first surfactant are surfactants of Formula 2; and wherein X is a hydrophilic moiety; and b) a second surfactant comprising a $C_{12}$-$C_{15}$ alkyl ethoxy sulfate with an average degree of ethoxylation of about 1.5 to about 3;

where each $C_{12}$-$C_{15}$ alkyl ethoxy sulfate comprises an alkyl chain;

wherein the second surfactant comprises from about 40 wt % to about 70 wt %, by weight of the second surfactant, of the $C_{12}$-$C_{15}$ alkyl ethoxy sulfate sulfate having fifteen carbon atoms in the alkyl chain;

wherein the second surfactant comprises no more than about 30 wt %, by weight of the second surfactant, of the $C_{12}$-$C_{15}$ alkyl ethoxy sulfate having fourteen carbon atoms in the alkyl chain;

wherein the second surfactant comprises from about 15% to about 50%, by weight of the second surfactant, of the $C_{12}$-$C_{15}$ alkyl ethoxy sulfate having thirteen carbon atoms in the alkyl chain; and wherein the ratio by weight of the first surfactant to the second surfactant is from about 15:1 to about 1:5.

14. The liquid detergent composition of claim 13, wherein between about 15% to about 40% by weight of the first surfactant, of the mixture of surfactant isomers of Formula 1 have n=1.

15. The liquid detergent composition of claim 13, wherein about 60% to about 90% by weight of the first surfactant, of the mixture of surfactant isomers of Formula 1 have n<3.

16. The liquid detergent composition of claim 13, wherein about 90% to about 100%, by weight of the first surfactant, surfactant isomers having m+n=11.

17. The liquid detergent composition of claim 16, wherein the alkyl chain has a weight average molecular weight of about 211 to about 220 daltons.

18. The liquid detergent composition of claim 17, wherein the composition has an actual stain removal index which is 0.5 or more greater than that of an expected stain removal index, the expected stain removal index representing the summation of stain removal indexes of a first reference composition representing the liquid detergent composition without the second surfactant and a second reference composition representing the liquid detergent without the first surfactant;

wherein the stain removal is measured on dust sebum, discriminative sebum, cooked beef, bacon grease, grass, or American tea.

19. The liquid detergent composition of claim 18, wherein the composition has a ratio by weight of the first surfactant to the second surfactant of about 10:1 to about 1:2.

20. The liquid detergent composition of claim 19 with from about 1% to about 10%, by weight of the composition of a first surfactant and from about 1% to about 10%, by weight of the composition of a second surfactant.

* * * * *